United States Patent
Bonic et al.

(10) Patent No.: US 12,393,408 B2
(45) Date of Patent: Aug. 19, 2025

(54) IDENTIFICATION AND REMOVAL OF REDUNDANT INTERFACES

(71) Applicant: Red Hat, Inc., Raleigh, NC (US)

(72) Inventors: Janos Bonic, Vienna (AT); Sanja Bonic, Vienna (AT); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 123 days.

(21) Appl. No.: 17/852,108

(22) Filed: Jun. 28, 2022

(65) Prior Publication Data

US 2023/0418580 A1 Dec. 28, 2023

(51) Int. Cl.
G06F 9/44 (2018.01)
G06F 8/41 (2018.01)
G06F 8/61 (2018.01)
G06F 8/71 (2018.01)

(52) U.S. Cl.
CPC .............. *G06F 8/4435* (2013.01); *G06F 8/62* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 8,510,727 B2 * | 8/2013 | Lobo | G06F 8/4435 717/165 |
| 9,846,905 B2 | 12/2017 | Katzin et al. | |
| 10,656,940 B1 | 5/2020 | Hogan et al. | |
| 11,340,895 B2 | 5/2022 | Tommasi et al. | |
| 2008/0172662 A1* | 7/2008 | Harris | G06F 8/443 717/159 |
| 2010/0058294 A1* | 3/2010 | Best | G06F 11/3688 717/122 |
| 2013/0139136 A1* | 5/2013 | Sathyanathan | G06F 8/4441 717/157 |
| 2016/0321036 A1 | 11/2016 | Schnepper et al. | |
| 2019/0004790 A1* | 1/2019 | Choudhary | G06F 21/44 |

(Continued)

FOREIGN PATENT DOCUMENTS

CN 112650680 A 4/2021
CN 108519890 B 7/2021

OTHER PUBLICATIONS

Adriano Carvalho de Paula et al., "An Exploratory Study of Interface Redundancy in Code Repositories", 2016) (Year: 2016).*

(Continued)

*Primary Examiner* — Bradley A Teets
*Assistant Examiner* — Lanny N Ung
(74) *Attorney, Agent, or Firm* — Dority & Manning, P.A.

(57) ABSTRACT

An interface in a first unit of software instructions is identified, the interface being configured to be invoked by an invoking unit of software instructions and when invoked, to invoke a function in a second unit of software instructions. A plurality of other units of software instructions are analyzed to identify a set of units of software instructions that are configured to invoke the interface. Based on the set of the units of software instructions and at least one criterion, data descriptive of modifications that modify the first unit of software instructions to remove software instructions that implement the interface is provided.

14 Claims, 9 Drawing Sheets

(56) References Cited

U.S. PATENT DOCUMENTS

2019/0278572 A1* 9/2019 Yoshida .................. G06F 8/75

OTHER PUBLICATIONS

Matias Martinez et al., Do the Fix Ingredients Already Exist? An Empirical Inquiry into the Redundancy Assumptions of Program Repair Approaches, Jun. 2014 (Year: 2014).*
Carol V. Alexandru et al., ("Reducing Redundancies in Multi-revision Code Analysis", 2017 (Year: 2017).*
Zoran Duric et al., A Source Code Similarity System for Plagiarism Detection, Mar. 2012, pp. 70-86 (Year: 2012).*
Ira D. Baxter et al., "Clone Detection Using Abstract Syntax Tree", Nov. 1998 (Year: 1998).*
Author Unknown, "Freedom From Redundancy Is A Trade-Off", BeMy Aficionado, Retrieved from internet: https://www.bemyaficionado.com/freedom-from-redundancy-is-a-trade-off/, Jan. 26, 2022, pp. 1-17.
Orchard et al., "Upgrading Fortran Source Code Using Automatic Refactoring," WRT '13: Proceedings of the 2013 ACM Workshop on Refactoring Tools, https://doi.org/10.1145/2541348.2541356, Oct. 27, 2013, pp. 1-4.

* cited by examiner

UNIT OF SOFTWARE INSTRUCTIONS (18-X)

```
function placeOrder(StorageAPI storage, Order order) {   } 28
    storage.storeOrder(order);
}

Interface StorageAPI {                                    } 26
    function storeOrder(Order order);
}
```

UNIT OF SOFTWARE INSTRUCTIONS (18-Y)

```
MySQLStorageAPI implements StorageAPI {                   } 30-1
    function storeOrder(Order order) {
        // store order in MySQL database
    }
}

// Test function. Not needed once pushed to production
InMemoryStorageAPI implements StorageAPI {                } 30-2
    function storeOrder(Order order) {
        // store order in memory
    }
}
```

*FIG. 3*

IDENTIFICATION AND REMOVAL OF REDUNDANT INTERFACES

BACKGROUND

Software instructions are written by engineers using a variety of programming languages. Many of these programming languages allow for the implementation of abstraction layers such as interfaces. Interfaces serve as an abstraction layer that can be invoked by an invoking unit of software instructions to invoke a function with expected behavior. The interface, once invoked, can invoke a variety of different functions that are each configured to provide the expected behavior.

SUMMARY

The examples implement mechanisms for removing redundant interfaces. An interface can be identified within a first unit of software instructions. The interface is configured to be invoked by an invoking unit of software instructions. When the interface is invoked, it invokes a function of a second unit of software instructions. Other units of software instructions (e.g., other packages) can be analyzed to identify units of instructions that are configured to invoke the interface. Based on the identified units of instructions, and other criterion(s), data can be provided (e.g., provided to a code versioning system, etc.) that describes modifications to the first unit of software instructions that remove the interface.

In one example a method is provided. The method includes identifying, by a computing system comprising one or more processor devices, an interface in a first unit of software instructions, the interface being configured to be invoked by an invoking unit of software instructions and when invoked, to invoke a function in a second unit of software instructions. The method further includes analyzing a plurality of other units of software instructions to identify a set of units of software instructions that are configured to invoke the interface. The method further includes, based on the set of the units of software instructions and at least one criterion, providing data descriptive of modifications that modify the first unit of software instructions to remove software instructions that implement the interface.

In another example, a computing system is provided. The computing system includes memory. The computing system includes one or more processor devices coupled to the memory. The one or more processors are to identify an interface in a first unit of software instructions, the interface being configured to be invoked by an invoking unit of software instructions and when invoked, to invoke a function in a second unit of software instructions. The one or more processors are to analyze a plurality of other units of software instructions to identify a set of units of software instructions that are configured to invoke the interface. The one or more processors are to, based on the set of the units of software instructions and the at least one criterion, provide data descriptive of modifications that modify the first unit of software instructions to remove software instructions that implement the interface.

In yet another example, a non-transitory computer-readable storage medium is provided. The non-transitory computer-readable storage medium includes executable instructions. The executable instructions are to cause a processor device to identify an interface in a first unit of software instructions, the interface being configured to be invoked by an invoking unit of software instructions and when invoked, to invoke a function in a second unit of software instructions. The executable instructions are to further cause the processor device to analyze a plurality of other units of software instructions to identify a set of units of software instructions that are configured to invoke the interface. The executable instructions are to further cause the processor device to based on the set of the units of software instructions and the at least one criterion, provide data descriptive of modifications that modify the first unit of software instructions to remove software instructions that implement the interface.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 3 illustrates example units of software instructions for identification and removal of interfaces according to some implementations of the present disclosure;

DETAILED DESCRIPTION

Figure 1A:
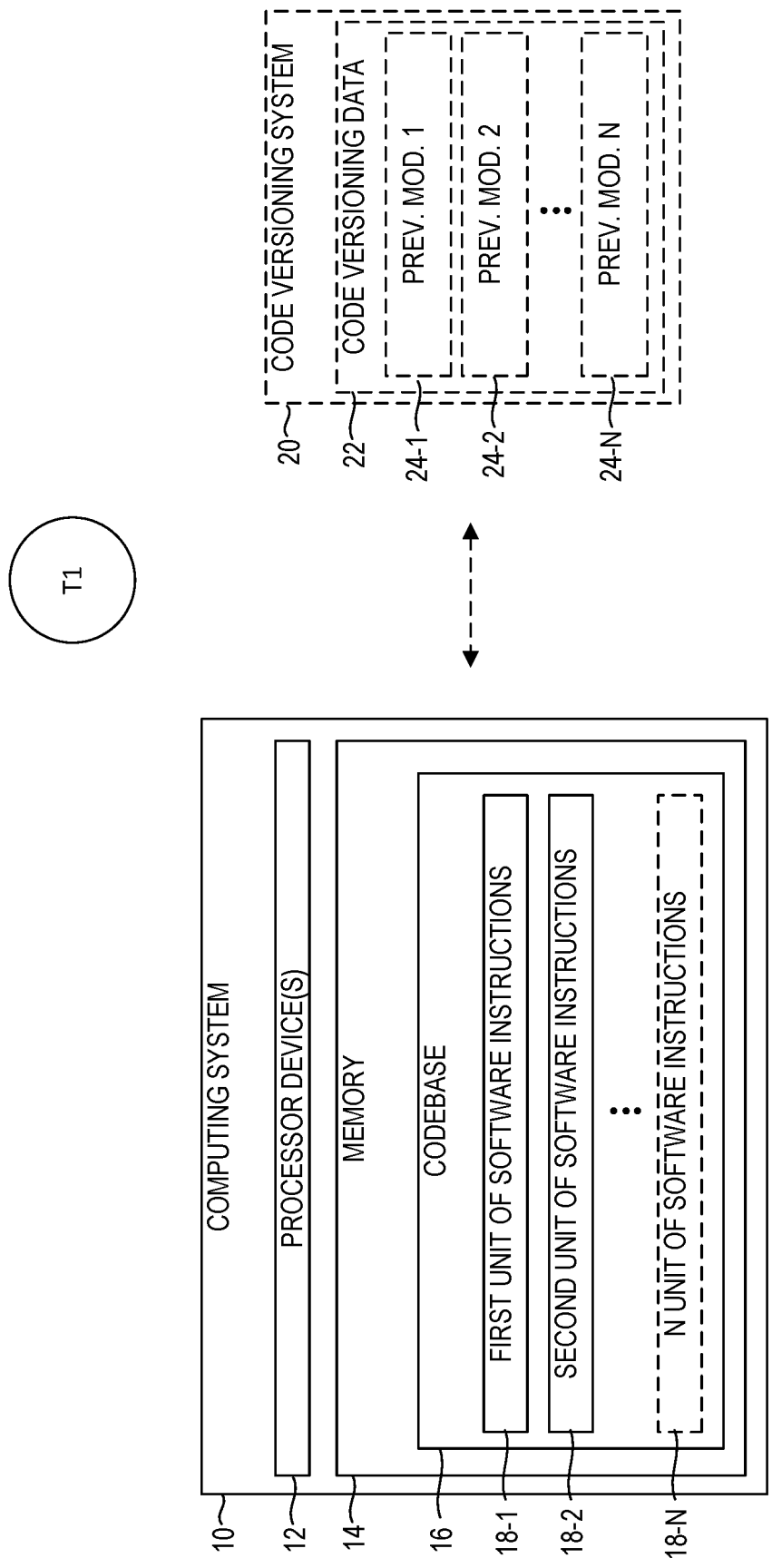
FIG. 1A is a block diagram of an environment suitable for implementing identification and removal of redundant interfaces at a first point in time according to some implementations of the present disclosure.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

In software engineering, an invoking unit of software instructions may directly invoke a function or may invoke a function indirectly via an intermediate unit of instructions, sometimes referred to as an abstraction layer, or an interface. By utilizing an abstraction layer such as an interface, a software engineer can write a unit of instructions that invokes an interface without regard for the function invoked by the interface.

As an example, an interface for a web shop application can include an interface for storing online orders. Two different functions can implement the interface to store the online orders in different manners. For example, the first function may store the online order to volatile memory (e.g., for testing storage functionality), and the second function may store the online order in an external database (e.g., for production-time implementation). When storing an order, a web shop function can invoke the interface to invoke either the first function or the second function. In such fashion, an interface can provide access to a number of different function implementations while maintaining behavior defined by the interface.

However, interfaces can be rendered redundant over the course of application development. To follow the previous example of the web store application, the interface for the order storage function can be implemented by a testing function that stores the order directly to memory, and a production-time function that stores the order to a database. Once the order storage feature is validated and pushed to production, the testing function may no longer be needed. After a period of time without utilization of the testing function, the interface can be deemed redundant, as the interface only provides access to a single production implementation (e.g., the database storage function).

Redundant interfaces often accumulate within large codebases over time and cause inefficiencies in the software development process. For example, these redundant interfaces must be actively maintained by developers, which requires substantial developer time and resources. For another example, by reducing the efficiency of the software development process, redundant interfaces can increase the likelihood that bugs and other errors appear within the codebase. As such, a process to identify and remove redundant interfaces is desired.

Accordingly, implementations of the present disclosure propose systems and methods to identify and remove redundant interfaces. Specifically, an interface can be identified within a first unit of software instructions (e.g., a package, a file, etc.). The interface is configured to be invoked by an invoking unit of software instructions. When the interface is invoked, it invokes a function of a second unit of software instructions. For example, a web shop function (e.g., an invoking unit of instructions) can invoke an interface for storage of web shop orders that is included in a unit of software instructions (e.g., a first unit of instructions). When invoked by the web shop function, the interface can invoke a database storage function that implements the interface (e.g., a second unit of instructions).

Once the interface is identified, other units of software instructions (e.g., other packages) can be analyzed to identify units of instructions that are also configured to invoke the interface. Based on the identified units of instructions, and other criterion(s), data can be provided (e.g., provided to a code versioning system, etc.) that describes modifications to the first unit of software instructions that remove the interface. To follow the previous example, the unit of software instructions that includes the storage interface for the web shop application can be modified to remove the software instructions that implement the storage interface. In such fashion, redundant interfaces can be identified and removed from codebases, therefore eliminating associated development inefficiencies.

As described, implementations of the present disclosure provide a number of technical effects and benefits. As one example technical effect and benefit, interfaces are often rendered redundant over the course of active development of applications. Redundant interfaces provide no benefit while also requiring the usage of substantial computing resources for engineers to maintain (e.g., memory, power consumption, compute cycles, storage, etc.). Additionally, by increasing inefficiencies in the software development process, redundant interfaces can indirectly lead to the inclusion of bugs and other errors within the codebase. However, implementations of the present disclosure can be utilized to identify and remove redundant interfaces within a codebase, therefore substantially reducing the consumption of resources required to maintain the redundant interfaces while also reducing the risk of bugs and other errors being included in the codebase.

FIG. 1A is a block diagram of an environment suitable for implementing identification and removal of redundant interfaces at a first point in time T1 according to some implementations of the present disclosure. A computing system 10 includes processor device(s) 12 and memory 14. In some implementations, the computing system 10 may be a computing system that includes multiple computing devices. Alternatively, in some implementations, the computing system 10 may be one or more computing device within a computing system that includes multiple computing devices. Similarly, the processor device(s) 12 may include any computing or electronic device capable of executing software instructions to implement the functionality described herein.

The memory 14 can be or otherwise include any device(s) capable of storing data, including, but not limited to, volatile memory (random access memory, etc.), non-volatile memory, storage device(s) (e.g., hard drive(s), solid state drive(s), etc.). The memory 14 can include a codebase 16 for one or more applications. The codebase 16 can include a plurality of units of software instructions 18-1 to 18-N (generally, software instructions 18). The codebase 16, and the units of software instructions 18, can be software instructions written in any type of programming language or schema (e.g., C, C++, java, assembly code, machine code, Python, etc.). For example, each of the units of software instructions 18 may be written in the C programming language. For another example, the first unit of software instructions 18-1 may be written in the C programming language while the second unit of software instructions 18-2 may be written in the Java programming language. For yet another example, the first unit of software instructions 18-1 may be written in the Python programming language, and the second unit of software instructions 18-2 may be an intermediate unit of software instructions that are configured to be interpreted by an interpreter or compiled by a compiler.

It should be noted that the unit of software instructions 18 may be organized according to any method or schema of organizing software instructions. For example, in some implementations, each of the units of software instructions 18 may be a discrete file of software instructions. Alternatively, in some implementations, the first unit of software instructions 18-1 and the second unit of software instructions 18-2 may each be discrete units of software instructions within the same file of software instructions. As such, it should be broadly understood that a unit of software instructions 18 refers to a discrete portion of software instructions which can be organized or separated according to any sort of organizational scheme.

In some implementations, the computing system 10 may be communicatively coupled to a code versioning system 20 that provides a code versioning service for the codebase 16. The code versioning system 20 can include any computing or electronic device(s) capable of providing a code versioning service for the codebase 16 of the computing system 10. It should be noted that in some implementations, the code versioning system 20 can be implemented by the computing system 10. For example, the code versioning system 20, and code versioning data 22, can be stored in the memory 14, and can be executed by the processor device(s) 12. Alternatively, in some implementations, the code versioning system 20 may be implemented by computing device(s) included within a computing system that includes the computing system 10 (e.g., a cloud computing system, etc.).

To provide the code versioning service, the code versioning system 20 can include code versioning data 22. The code versioning data 22 can describe various aspects of the codebase 16, including previous modifications 24-1-24-M (generally, previous modifications 24) made to the codebase 16. For example, at a previous point in time, the codebase 16 may have been modified to include additional units of software instructions 18. The code versioning data 22 can include data that describes the previous modification 24.

In some implementations, the code versioning system 20 can obtain requests to modify the codebase 16. For example, the code versioning system can receive a pull request that includes, or otherwise describes, modifications to the codebase 16. The code versioning system 20 may notify a user of the code versioning system 20 of receipt of the pull request. If the user of the code versioning system 20 approves the pull request, the code versioning system 20 can communicate with the computing system 10 to modify the codebase 16 based on the pull request. Alternatively, in some embodiments, the code versioning system 20 may automatically modify the codebase 16 based on the pull request without approval from a user of the code versioning system 20.

Figure 1B:
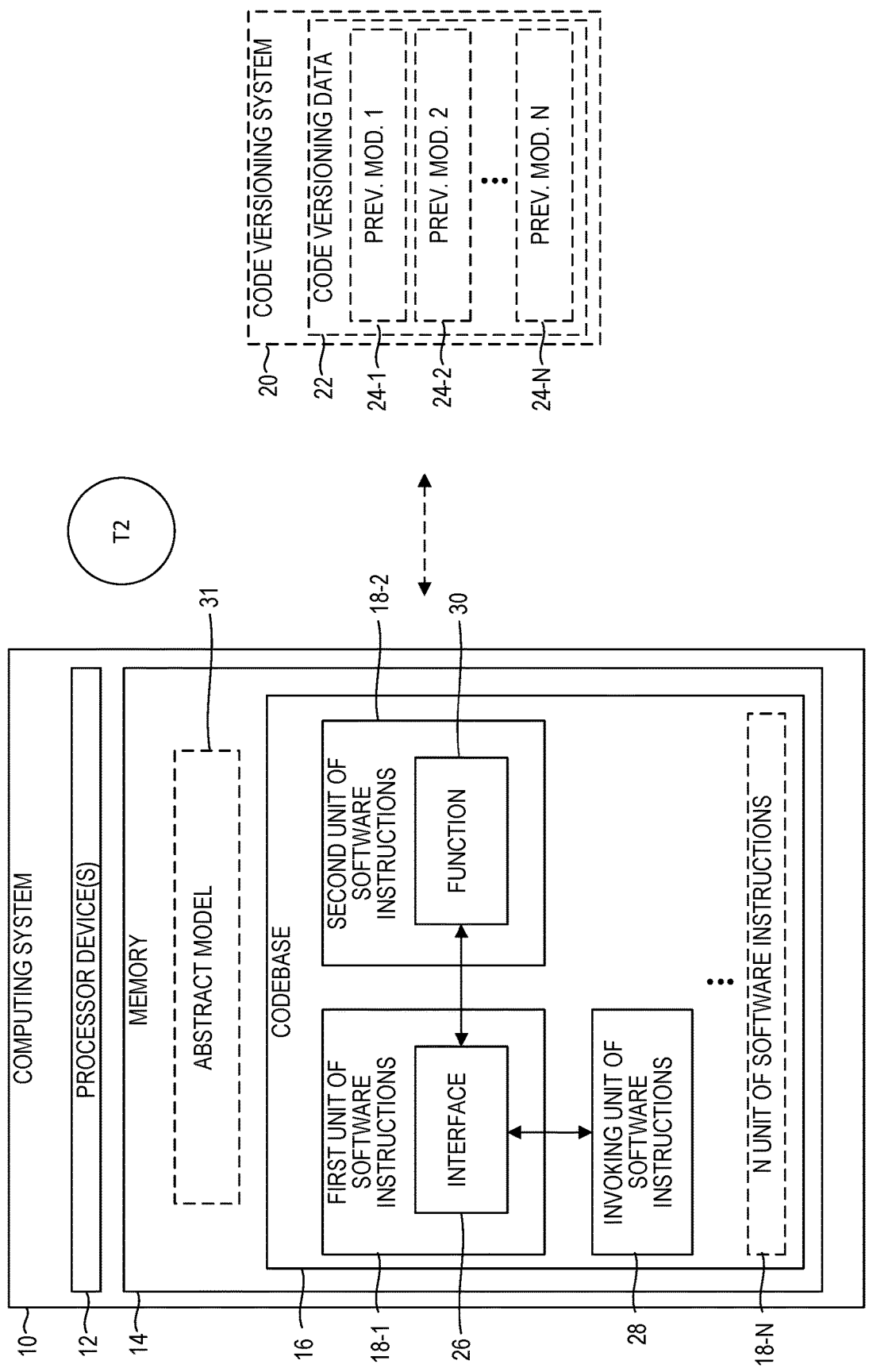
FIG. 1B is a block diagram of an environment suitable for implementing identification and removal of redundant interfaces at a second point in time according to some implementations of the present disclosure.

FIG. 1B is a block diagram of an environment suitable for implementing identification and removal of redundant interfaces at a second point in time T2 according to some implementations of the present disclosure. At time T2, the computing system 10 can identify an interface 26 within the first unit of software instructions 18-1. The interface 26 can be an abstraction layer that is configured to, when invoked by an invoking unit of software instructions 28, invoke a function 30 in the second unit of software instructions 18-2. Specifically, the invoking unit of software instructions 28 can be a package, a function, or some other discrete unit of software instructions in the plurality of units of software instructions 18. The invoking unit of software instructions 28 can invoke the interface 26, and in turn, the interface 26 can invoke the function 30 of the second unit of software instructions 18-2.

As an example, the invoking unit of software instructions 28 can be a unit of software instructions for a web shop application. The function 30 can be a function to store web orders for a web shop application. The interface 26 can be an interface configured to invoke various functions for storing web orders for web shop applications.

It should be noted that, as depicted, the interface 26 is only configured to invoke a single function 30. To follow the previous example, the function 30 may be a function for storing web shop orders in a SQL database. At a previous point in time, the interface 26 may have been configured to invoke either the function 30 or a different testing function that stores web shop orders in volatile memory. However, at the current point in time T2, the testing function may be deprecated, and the interface 26 may be configured only to invoke the function 30, therefore rendering the interface 26 redundant. However, an interface can be configured to invoke more than one function and still be redundant.

In some implementations, the invoking unit of software instructions 28 may be, include, or be included in the first unit of software instructions 18-1. For example, the first unit of software instructions 18-1 and the invoking unit of software instructions 28 may be included in a first file of software instructions, and the second unit of software instructions 18-2 may be included in a second file of software instructions. Alternatively, in some implementations, the first unit of software instructions 18-1 can be included in a first file of software instructions, the second unit of software instructions 18-2 can be included in a second file of software instructions, and the invoking unit of software instructions 28 may be included in a third file of software instructions.

In some implementations, the computing system 10 may perform code analysis with the help of Reflection, or code compilation (e.g., into an abstract syntax tree, etc.), on the codebase 16 to identify the interface 26 in the first unit of software instructions. Specifically, in some implementations, the computing system 10 can build a meta-model for the codebase 16 that enumerates the units of software instructions included in the codebase. The computing system 10 can then identify certain units of software instructions that include interfaces that are candidates for removal. Specifically, the computing system 10 can traverse the meta-model to identify references to the interfaces in questions. In addition, this meta-model can be utilized by the computing system 10 to determine whether units of code that invoke the interface are for testing purposes or for production, etc.

For example, in some implementations, the computing system 10 can generate an abstract model 31 that identifies a plurality of units of software instructions 18 that collectively include the codebase 16 of an application (e.g., an abstract syntax tree, a meta-model, etc.). Based at least in part on the abstract model 31, the computing system 10 can identify that the first unit of software instructions includes the interface, and that the interface is configured to invoke the function 30.

Figure 1C:
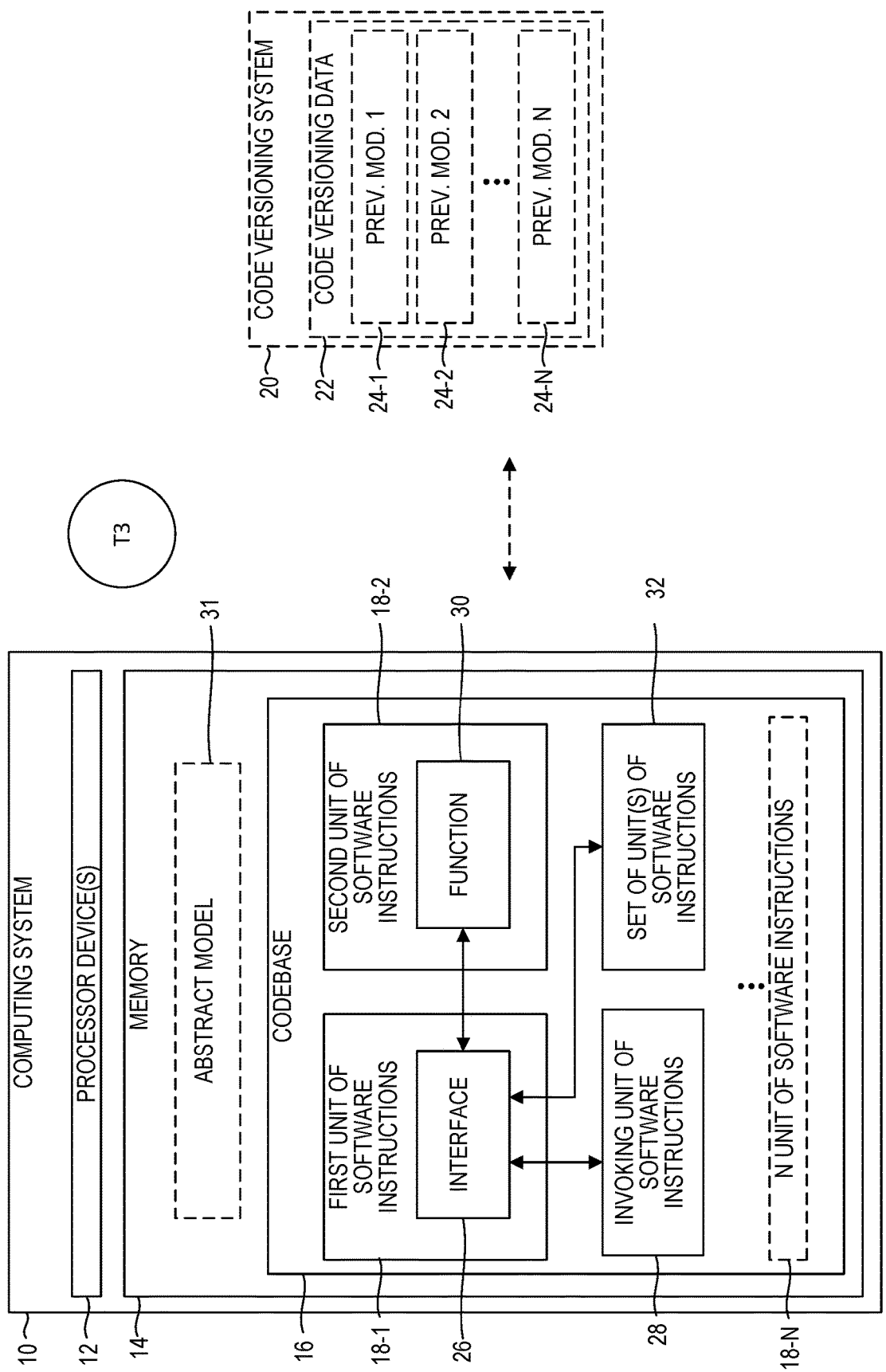
FIG. 1C is a block diagram of an environment suitable for implementing identification and removal of redundant interfaces at a third point in time according to some implementations of the present disclosure.

FIG. 1C is a block diagram of an environment suitable for implementing identification and removal of redundant interfaces at a third point in time T3 according to some implementations of the present disclosure. At time T3, the computing system 10 can analyze a plurality of other units of software instructions 18 of the plurality of software instructions 18 to identify a set of unit(s) of software instructions 18 that are configured to invoke the interface 26. In some implementations, the computing system 10 can utilize the abstract model 31 to identify invocations of the interface 26 by the set of unit(s) of software instructions.

Figure 1D:
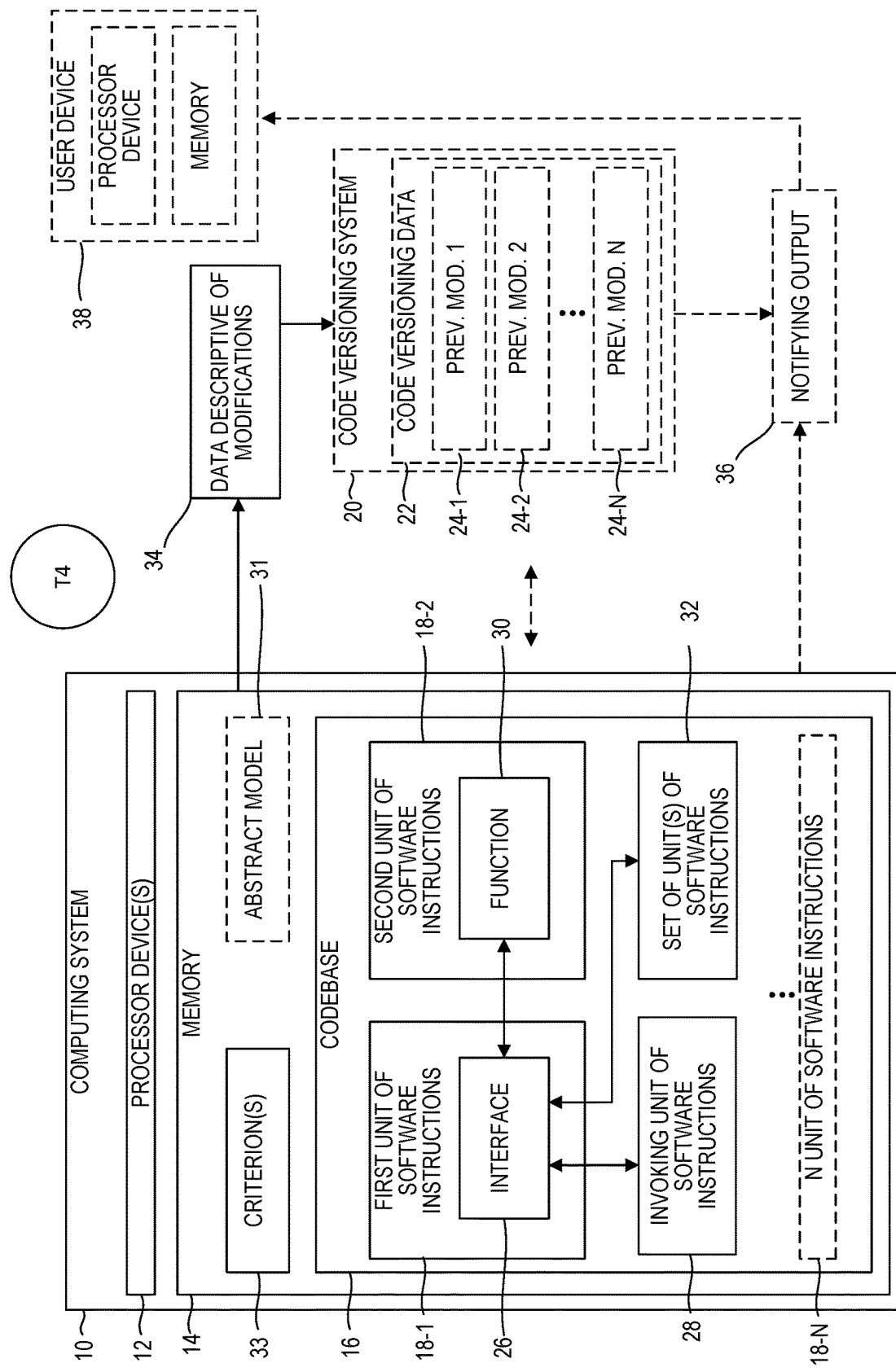
FIG. 1D is a block diagram of an environment suitable for implementing identification and removal of redundant interfaces at a fourth point in time according to some implementations of the present disclosure.

FIG. 1D is a block diagram of an environment suitable for implementing identification and removal of redundant interfaces at a fourth point in time T4 according to some implementations of the present disclosure. Based on the set of the unit(s) of software instructions 32, and at least one criterion 33, the computing system 10 can provide data descriptive of modifications that modify the first unit of software instructions 18-1 to remove the interface 26. The at least one criterion 33 can be a criterion associated with aspect(s) of the codebase 16. In some implementations, the at least one criterion 33 may include a number of units of software instructions included in the set of units of software instructions 32. For example, if the interface 26 is invoked by many different units of software instructions, it may be likely that the interface 26 is not redundant. Conversely, if the interface 26 is only invoked by a few different units of software instructions, it may be likely that the interface 26 is redundant. In some implementations, the at least one criterion 33 can be or include a degree of documentation associated with the interface 26 (e.g., a number of comments left within the codebase 16 or the code versioning system 20 by software engineers, etc.). In some implementations, the at least one criterion 33 can be or include a number of functions invoked by the interface 26. For example, if the interface 26 invokes a large number of functions, it may be likely that the interface 26 is not redundant. Conversely, if the interface 26 only invokes one or two functions, it may be likely that the interface 26 is redundant.

It should be noted that the above at least one criterion 33 are only a few of a number of different criteria that can be evaluated by the computing system 10. For example, the at least one criterion 33 may include, but is not limited to:

A date on which the invoking unit of software instructions 28 was last modified.

A date on which the instructions of the first unit of software instructions 18-1 that implement the interface 26 was last modified.

A degree of complexity of the interface 26 (e.g., a number of parameters, etc.).

A number of software instructions within the first unit of software instructions 18-1.

An intended purpose of the invoking unit of software instructions 28. For example, if the intended purpose of the invoking unit of software instructions 28 is for testing, it may be more likely that the interface 26 is redundant.

Whether the function 30 of the second unit of software instructions 18-2 is a second abstraction layer/interface.

In some implementations, the at least one criterion 33 can be determined based at least in part on the code versioning data 22 from the code versioning system 20. For example, the at least one criterion 33 may be, or may otherwise be derived from, the previous modifications 24-1 to 24-N.

Based on the at least one criterion 33 and the set of the units of software instructions 32, the computing system 10 can provide data descriptive of the modifications 34. The modifications described by the data can be modifications that modify the first unit of software instructions 18-1 to remove the interface 26. For example, the interface 26 can be implemented via software instructions included within the first unit of software instructions 18-1. The modifications can modify the first unit of software instructions 18-1 to delete the software instructions that implement the interface 26.

It should be noted that the data descriptive of the modifications 34 can describe the modifications that modify the first unit of software instructions 18-1 in any fashion. In some implementations, the data descriptive of the modifications 34 can be or otherwise include a summarization of the modifications to the first unit of software instructions 18-1. For example, the data descriptive of the modifications 34 can indicate which software instructions of the first unit of software instructions 18-1 (i.e., which lines of code, etc.) are to be deleted, and can indicate to a user of the code versioning system 20 that the instructions are being deleted to remove a redundant interface.

Additionally, or alternatively, in some implementations the data descriptive of the modifications 34 may be or otherwise include software instructions that, when executed, remove software instructions that implement the interface 26 from the first unit of software instructions 18-1. In some implementations, the data descriptive of the modifications 34 can be formatted as a pull request to the code versioning system 20. The pull request can indicate the modifications to the codebase 16 to users of the code versioning system 20 and can be approved by users of the code versioning system 20. Once approved, the codebase 16 can be modified according to the modifications described by the pull request.

In some implementations, the modifications described by the data descriptive of the modifications 34 can modify the invoking unit of software instructions 28 to remove software instructions that invoke the interface 26 from the invoking unit of software instructions 28. For example, the invoking unit of software instructions 28 may include the following software instructions, represented as pseudocode, that invoke the interface:

```
1    func invoking_function (input)
2    {
3        interface (input);
4    }
```

The modifications can modify the invoking unit of software instructions 28 to remove line 3, which invokes the interface 26.

Additionally, in some implementations, the modifications described by the data descriptive of the modifications 34 can modify the invoking unit of software instructions 28 to add software instructions that directly invoke the function 30 of the second unit of software instructions 18-2. To follow the previous example, the interface 26, once invoked, may call the function 30, represented in pseudocode as invoked_function (input). The invoking unit of software instructions 28 can be modified to add software instructions that directly invoke the function 30 as indicated in line 3 of the following pseudocode:

```
1    func invoking_function (input)
2    {
3        invoked_function (input);
4    }
```

In such fashion, the redundant interface can be removed from the codebase 16, while maintaining functionality in all modified units of software instructions within the codebase 16.

In some implementations, the data descriptive of the modifications 34 can be provided to the code versioning system 20. In some implementations, a notifying output 36 can be generated that notifies one or more users of the code versioning system 20 of the data descriptive of the modifications to the code versioning system. For example, the notifying output 36 may be configured to alert a user device 38 of a user of the code versioning system 20. For another example, the notifying output 36 may be configured to instruct the code versioning system 20 to provide a notification to the user device 38.

Figure 1E:
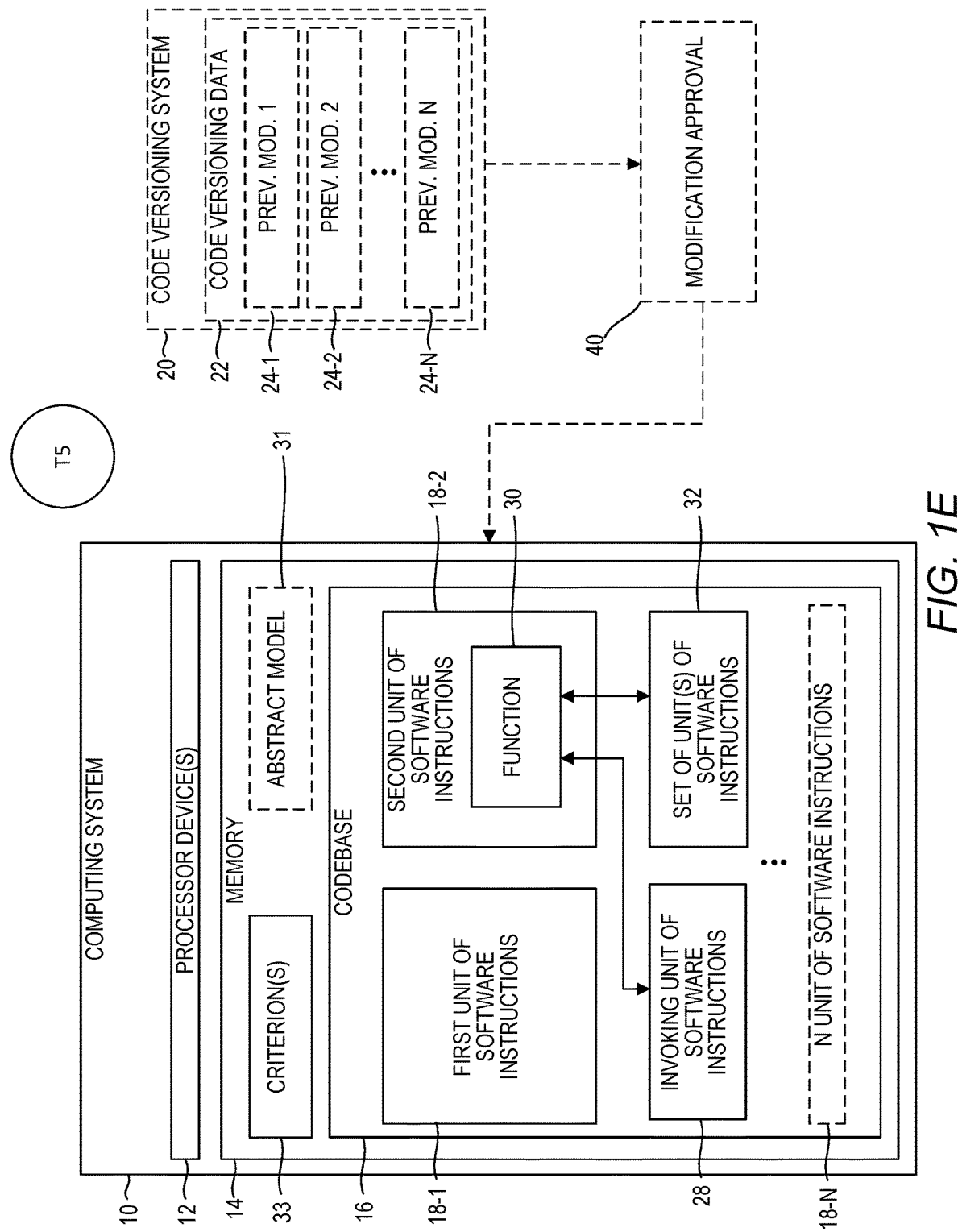
FIG. 1E is a block diagram of an environment suitable for implementing identification and removal of redundant interfaces at a fifth point in time according to some implementations of the present disclosure.

FIG. 1E is a block diagram of an environment suitable for implementing identification and removal of redundant interfaces at a fifth point in time T5 according to some implementations of the present disclosure. At time T5, the computing system 10 can modify the first unit of software instructions 18-1 to remove software instructions from the first unit of software instructions 18-1 that implement the interface 26, as described previously. In some implementations, the invoking unit of software instructions 28 can be further modified to directly invoke the function 30 in the second unit of software instructions 18-2.

In some implementations, the codebase (e.g., the units of software instructions) can be modified responsive to receipt of data that indicates approval of the modifications to the codebase 16. For example, in some implementations, the data descriptive of the modifications 34 can be provided to the code versioning system 20 at T4 as a pull request. A user of the code versioning system 20 can approve the pull request. The code versioning system 20 can provide data that indicates approval of the pull request, and in response, the computing system 10 can modify the codebase 16.

Figure 2:
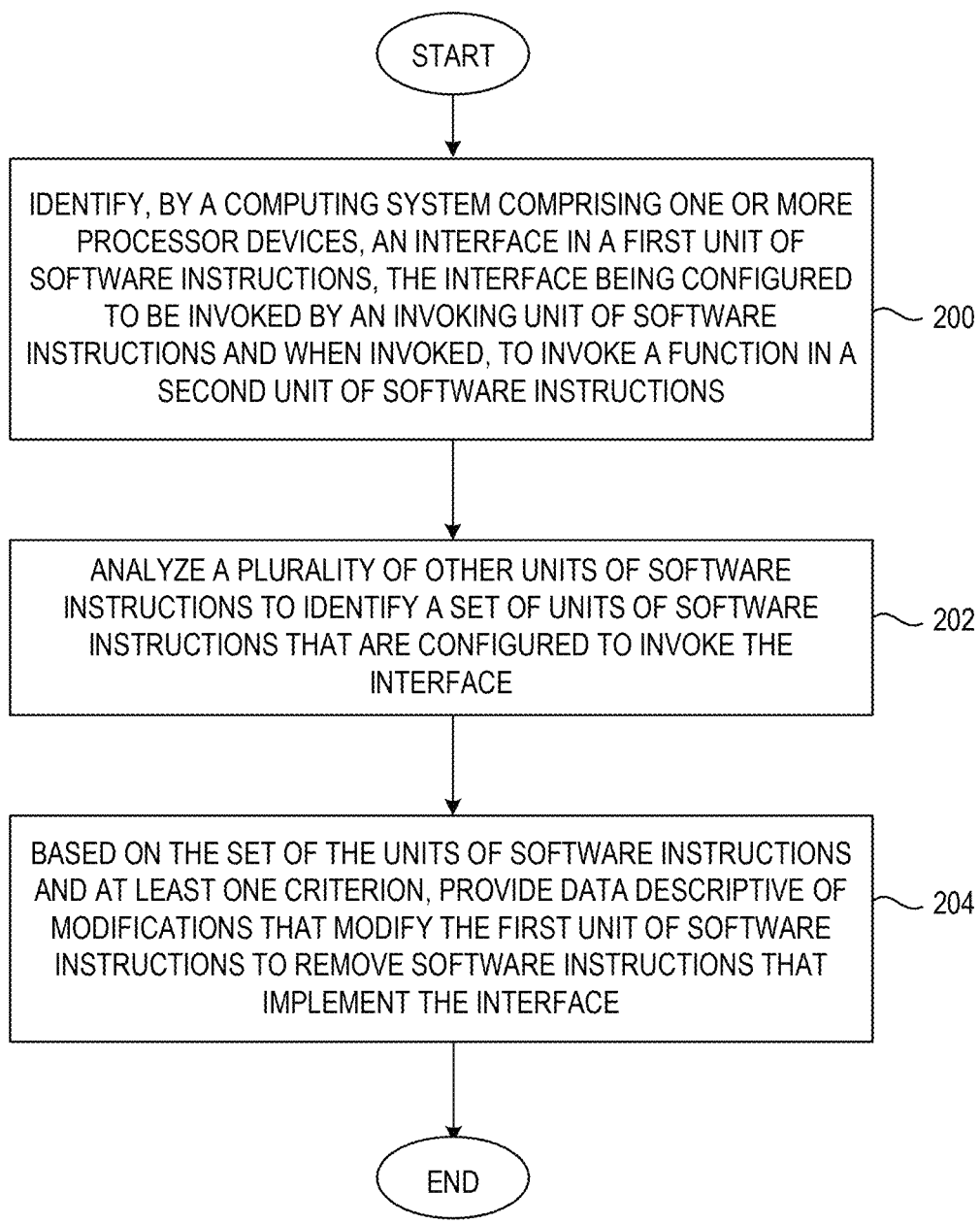
FIG. 2 is a flowchart of a method for identifying and removing redundant interfaces according to some implementations of the present disclosure.

FIG. 2 is a flowchart of a method for identifying and removing redundant interfaces according to some implementations of the present disclosure. FIG. 2 will be discussed in conjunction with FIGS. 1A-1E. The computing system 10 identifies the interface 26 in the first unit of software instructions 18-1, the interface 26 being configured to be invoked by the invoking unit of software instructions 28 and when invoked, to invoke the function 30 in the second unit of software instructions 18-2 (FIG. 2, block 200). The computing system 10 analyzes the plurality of other units of software instructions 18 to identify a set of units of software instructions 18 that are configured to invoke the interface 26 (FIG. 2, block 202). The computing system 10, based on the set of the units of software instructions 18 and at least one criterion 33, provides the data descriptive of the modifications 34 that modify the first unit of software instructions 18-1 to remove software instructions that implement the interface 26 (FIG. 2, block 204).

FIG. 3 illustrates example units of software instructions for identification and removal of interfaces according to some implementations of the present disclosure. FIG. 3 will be discussed in conjunction with FIGS. 1A-1E. It should be noted that although FIG. 3 includes software instructions written according to the Java programming language, implementations of the present disclosure are not limited to any specific programming language. Rather, implementations of the present disclosure may be utilized using any programming language(s), intermediate software instruction(s), compiled software instruction(s), machine code, etc.

It should be noted that in some implementations, a unit of software instructions may include multiple other units of software instructions. For example, as depicted in FIG. 3, the unit of software instructions 18-X includes the invoking unit of software instructions 28 and interface 26. The invoking unit of software instructions 28 invokes a StorageAPI interface 26. Specifically, the invoking unit of software instructions 28 implements a function that places an order in a web shop. The interface 26 is an interface for storing the orders from the web shop. The interface 26 is invoked by the invoking unit of software instructions 28.

The unit of software instructions 18-Y includes function 30-1 and function 30-2. As depicted, function 30-1 provides a function that implements the interface 26 to store a web shop order in a MySQL database. Similarly, function 30-2 provides a function that implements the interface 26 to store a web shop order in memory (e.g., random access memory.). Additionally, as depicted, documentation has been provided by a software engineer within the function 30-2 that indicates the function 30-2 is only for testing, and may not be invoked by the interface after the web shop order is pushed to production. For example, it may be determined that the interface is redundant after a period of time in which the code has not been modified.

Once the codebase of the web shop application that includes the units of software instructions 18-X and 18-Y has completed testing, the web shop application may enter production. After a period of production time, implementations of the present disclosure can be utilized to remove the interface 26. Specifically, after a period of production time in which code that implements the interface is not modified to invoke the function 30-2 (e.g., three months, six months, one year, etc.), (e.g., six months, one year, etc.), it may be determined that the interface only invokes one production implementation (e.g., function 30-1), and is therefore redundant. As such, according to implementations of the present disclosure, the interface 26 may be removed from the unit of software instructions 18-X. In some implementations, the invoking unit of software instructions 28 may also be modified to directly invoke the function 30-1 (e.g., the MySQL StorageAPI function).

In some implementations, the function 30-1 may be modified so that the MySQLStorageAPI function can be invoked directly by the placeOrder function of the invoking unit of software instructions 28. For example, the MySQLStorageAPI function 30-1 may be modified to be an independent function that does not implement the now-removed interface 26 so that the MySQLStorageAPI function 30-1 can be called directly by the placeOrder function of the invoking unit of software instructions 28.

Figure 4:
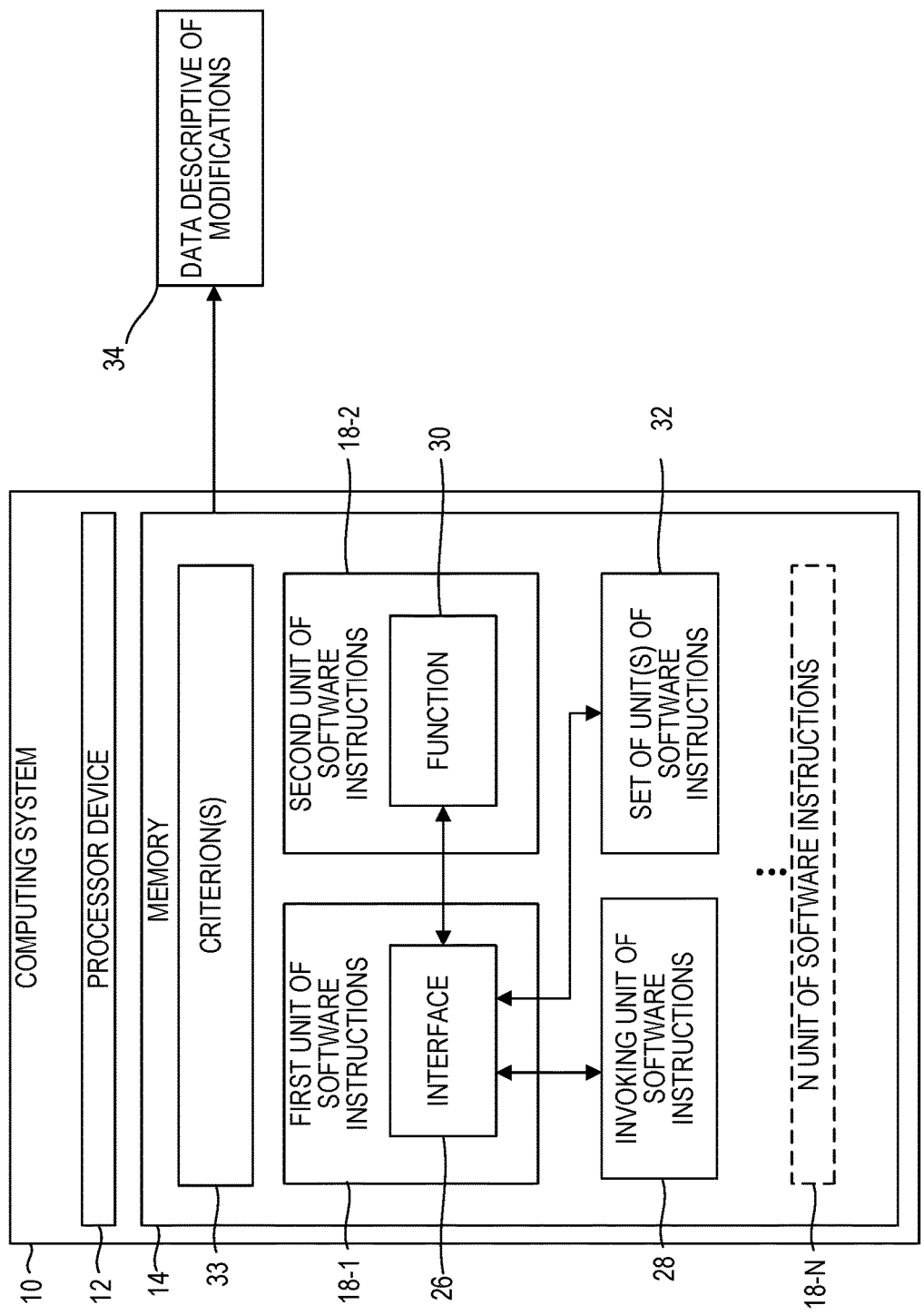
FIG. 4 is simplified block diagram of the environment illustrated in FIGS. 1A-1E according to one implementation.

FIG. 4 is simplified block diagram of the environment illustrated in FIGS. 1A-1E according to one implementation. The computing system 10 includes the memory 14 and the processor device(s) 12 coupled to the memory 14. The processor device(s) 12 is to identify the interface 26 in the first unit of software instructions 18-1, the interface 26 being configured to be invoked by the invoking unit of software instructions 28 and when invoked, to invoke the function 30 in the second unit of software instructions 18-2. The processor device(s) 12 is further to analyze the plurality of other units of software instructions 18 to identify the set of units of software instructions 32 that are configured to invoke the interface 26. The processor device(s) 12 is further to, based on the set of the units of software instructions 32 and the at least one criterion 33, provide the data descriptive of the modifications 34 that modify the first unit of software instructions 18-1 to remove software instructions that implement the interface 26.

Figure 5:
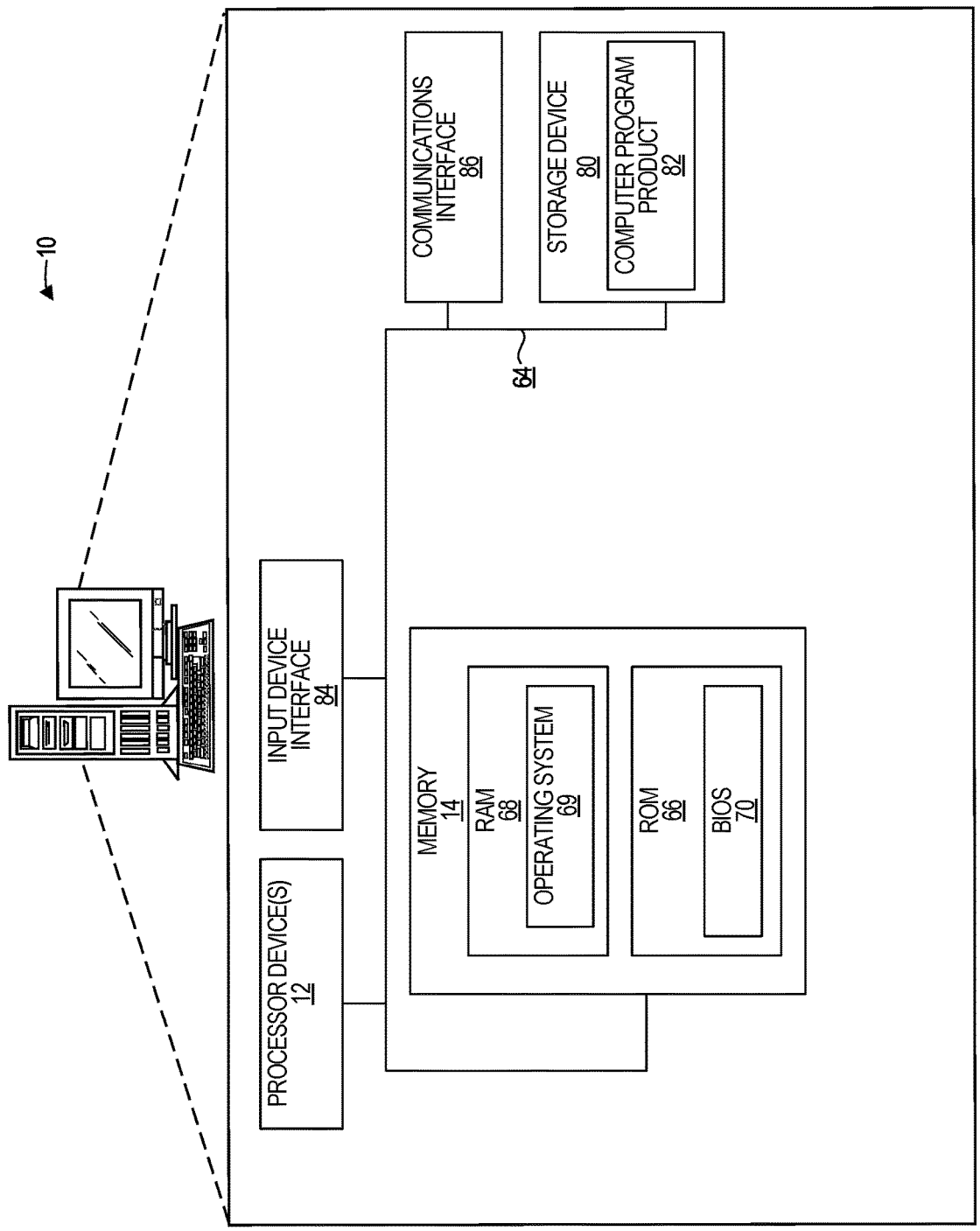
FIG. 5 is a block diagram of a computing device suitable for implementing examples according to some implementations of the present disclosure.

FIG. 5 is a block diagram of the computing system 10 suitable for implementing examples according to some implementations of the present disclosure. The computing system 10 may comprise any computing or electronic device capable of including firmware, hardware, and/or executing software instructions to implement the functionality described herein, such as a computer server, a desktop computing device, a laptop computing device, a smartphone, a computing tablet, or the like. The computing system 10 includes the processor device(s) 12, the memory 14, and a system bus 64. The system bus 64 provides an interface for system components including, but not limited to, the memory 14 and the processor device(s) 12. The processor device(s) 12 can be or otherwise include one or more of any commercially available or proprietary processor.

The system bus 64 may be any of several types of bus structures that may further interconnect to a memory bus (with or without a memory controller), a peripheral bus, and/or a local bus using any of a variety of commercially available bus architectures. The memory 14 (e.g., system memory, etc.) may include non-volatile memory 66 (e.g., read-only memory (ROM), erasable programmable read-only memory (EPROM), electrically erasable programmable read-only memory (EEPROM), etc.), and volatile memory 68 (e.g., random-access memory (RAM)). A basic input/output system (BIOS) 70 may be stored in the non-volatile memory 66 and can include the basic routines that help to transfer information between elements within the computing system 10. The volatile memory 68 may also include a high-speed RAM, such as static RAM, for caching data.

The computing system 10 may further include or be coupled to a non-transitory computer-readable storage medium such as the storage device 80, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 80 and other drives associated with computer-readable media and computer-usable media may provide non-volatile storage of data, data structures, computer-executable instructions, and the like.

A number of modules can be stored in the storage device 80 and in the volatile memory 68, including an operating system 69 and one or more program modules, which may implement the functionality described herein in whole or in part. All or a portion of the examples may be implemented as a computer program product 82 stored on a transitory or non-transitory computer-usable or computer-readable storage medium, such as the storage device 80, which includes complex programming instructions, such as complex computer-readable program code, to cause the processor device(s) 12 to carry out the steps described herein. Thus, the computer-readable program code can comprise software instructions for implementing the functionality of the examples described herein when executed on the processor device(s) 12. The processor device(s) 12, in conjunction with the storage device 80 or the non-volatile memory 66, may serve as a controller, or control system, for the computing system 10 that is to implement the functionality described herein.

An operator, such as a user, may also be able to enter one or more configuration commands through a keyboard (not illustrated), a pointing device such as a mouse (not illustrated), or a touch-sensitive surface such as a display device. Such input devices may be connected to the processor device(s) 12 through an input device interface 84 that is coupled to the system bus 64 but can be connected by other interfaces such as a parallel port, an Institute of Electrical and Electronic Engineers (IEEE) 1394 serial port, a Universal Serial Bus (USB) port, an IR interface, and the like. The computing system 10 may also include the communications interface 86 suitable for communicating with the network 50 as appropriate or desired. The computing system 10 may also include a video port configured to interface with a display device, to provide information to the user.

Individuals will recognize improvements and modifications to the preferred examples of the disclosure. All such improvements and modifications are considered within the scope of the concepts disclosed herein and the claims that follow.

The invention claimed is:

1. A method comprising:
generating, by a computing system comprising one or more processor devices, a syntax tree that identifies a plurality of units of software instructions that collectively comprise a codebase of an application, wherein generating the syntax tree comprises compiling, by the computing system, the codebase of the application to generate the syntax tree;
based on the syntax tree, identifying, by the computing system, an interface in a first unit of software instructions of the plurality of units of software instructions, the interface being configured to be invoked by an invoking unit of software instructions and when invoked, to invoke a function in a second unit of software instructions of the plurality of units of software instructions;
analyzing a plurality of other units of software instructions of the plurality of units of software instructions to identify a set of units of software instructions that are configured to invoke the interface;
based on the set of the units of software instructions and at least one criterion, modifying the first unit of software instructions to remove software instructions that implement the interface from the codebase of the application, wherein the at least one criterion comprises a number of units of software instructions included in the set of the units of software instructions being less than a threshold number of units of software instructions, wherein modifying the first unit of software instructions comprises modifying the first unit of software instructions to be an independent function that does not implement the interface, and wherein modifying the first unit of software instructions reduces a quantity of computing resources required to execute the first unit of software instructions; and
modifying the invoking unit of software instructions to replace software instructions that invoke the interface from the invoking unit of software instructions with software instructions that directly invoke the function in the second unit of software instructions.

2. The method of claim 1, wherein a first file comprising software instructions comprises the first unit of software instructions and a second file comprising software instructions comprises the second unit of software instructions.

3. The method of claim 2, wherein a third file comprising software instructions comprises the invoking unit of software instructions.

4. The method of claim 2, wherein the first file comprising software instructions further comprises the invoking unit of software instructions.

5. The method of claim 1, wherein modifying the first unit of software instructions to remove the software instructions that implement the interface comprises:
providing, to a code versioning system, data descriptive of modifications made by the computing system to modify the first unit of software instructions to remove the interface.

6. The method of claim 5, wherein the method further comprises generating an output that notifies one or more users of the code versioning system of the data descriptive of the modifications made by the computing system to the code versioning system.

7. The method of claim 5, wherein the data descriptive of the modifications made by the computing system comprises a summarization of modifications that modify the first unit of software instructions to remove the interface.

8. The method of claim 5, wherein modifying the first unit of software instructions to remove the software instructions that implement the interface further comprises obtaining data from the code versioning system that indicates approval of the modifications.

9. The method of claim 1, wherein analyzing the plurality of other units of software instructions further comprises analyzing code versioning data from a code versioning system that identifies previous modifications to at least the first unit of code; and
wherein the at least one criterion comprises the previous modifications.

10. The method of claim 1, wherein the at least one criterion further comprises one or more of:
a number of functions invoked by the interface; or
a degree of documentation associated with the interface.

11. The method of claim 1, wherein the codebase of the application comprises the first unit of software instructions, the invoking unit of software instructions, and the second unit of software instructions.

12. A computing system comprising:
memory; and
one or more processor devices coupled to the memory to:
generate a syntax tree that identifies a plurality of units of software instructions that collectively comprise a codebase of an application, wherein generating the syntax tree comprises compiling the codebase of the application to generate the syntax tree;
based on the syntax tree, identify an interface in a first unit of software instructions of the plurality of units of software instructions, the interface being configured to be invoked by an invoking unit of software instructions and when invoked, to invoke a function in a second unit of software instructions of the plurality of units of software instructions;
analyze a plurality of other units of software instructions of the plurality of units of software instructions to identify a set of units of software instructions that are configured to invoke the interface;
based on the set of the units of software instructions and the at least one criterion, modify the first unit of software instructions to remove software instructions that implement the interface from the codebase of the application, wherein the at least one criterion comprises a number of units of software instructions included in the set of the units of software instructions being less than a threshold number of units of software instructions, wherein modifying the first unit of software instructions comprises modifying the first unit of software instructions to be an independent function that does not implement the interface, and wherein modifying the first unit of software instructions reduces a quantity of computing resources required to execute the first unit of software instructions; and
modify the invoking unit of software instructions to replace software instructions that invoke the interface from the invoking unit of software instructions with software instructions that directly invoke the function in the second unit of software instructions.

13. The computing device of claim 12, wherein, to modify the first unit of software instructions, the one or more processor devices are further to:
provide data descriptive of modifications made by the computing system to modify the first unit of software instructions to remove the interface.

14. A non-transitory computer-readable storage medium that includes executable instructions to cause a processor device to:
generate a syntax tree that identifies a plurality of units of software instructions that collectively comprise a codebase of an application, wherein generating the syntax tree comprises compiling the codebase of the application to generate the syntax tree;
based on the syntax tree, identify an interface in a first unit of software instructions of the plurality of units of software instructions, the interface being configured to be invoked by an invoking unit of software instructions and when invoked, to invoke a function in a second unit of software instructions of the plurality of units of software instructions;
analyze a plurality of other units of software instructions of the plurality of units of software instructions to identify a set of units of software instructions that are configured to invoke the interface;
based on the set of the units of software instructions and the at least one criterion, modify the first unit of software instructions to remove software instructions that implement the interface from the codebase of the application, wherein the at least one criterion comprises a number of units of software instructions included in the set of the units of software instructions being less than a threshold number of units of software instructions, wherein modifying the first unit of software instructions comprises modifying the first unit of software instructions to be an independent function that does not implement the interface, and wherein modifying the first unit of software instructions reduces a quantity of computing resources required to execute the first unit of software instructions; and
modify the invoking unit of software instructions to replace software instructions that invoke the interface from the invoking unit of software instructions with software instructions that directly invoke the function in the second unit of software instructions.

* * * * *